United States Patent [19]
Meyerhoefer et al.

[11] Patent Number: 5,604,556
[45] Date of Patent: Feb. 18, 1997

[54] CAMERA WITH INDICATOR FOR PREVENTING LOAD OF EXPOSED FILM

[75] Inventors: Daniel T. Meyerhoefer, Penfield; Bruce A. Leonard, Honeoye Falls, both of N.Y.

[73] Assignee: Eastman Kodak Company, Rochester, N.Y.

[21] Appl. No.: 420,255

[22] Filed: Apr. 11, 1995

[51] Int. Cl.$^6$ ............................ G03B 17/02; G03B 17/26
[52] U.S. Cl. ........................ 396/285; 396/516; 396/538
[58] Field of Search ............................ 354/207, 208, 354/210, 275, 288, 474, 475

[56] References Cited

U.S. PATENT DOCUMENTS

| | | | |
|---|---|---|---|
| 3,205,800 | 9/1965 | Peterson | 95/11 |
| 3,427,942 | 2/1969 | Browning | 95/11 |
| 4,994,828 | 2/1991 | Smart | 354/21 |
| 4,994,833 | 2/1991 | Cocca | 354/207 |
| 5,138,350 | 8/1992 | Cocca | 354/21 |
| 5,343,265 | 8/1994 | Oi et al. | 354/222 |
| 5,347,334 | 9/1994 | Smart et al. | 354/275 |

Primary Examiner—Safet Metjahic
Assistant Examiner—John Chizmar
Attorney, Agent, or Firm—Roger A. Fields

[57] ABSTRACT

A family of different type cameras is intended for use with a film cassette which is capable of being operated to thrust a filmstrip out of the cassette housing, regardless of whether the filmstrip is unexposed or is partially exposed, and which has film exposure-status indicating means for providing visible indications that the filmstrip inside the cassette housing is unexposed or is partially exposed. One type camera intended to be used only with a film cassette containing an unexposed filmstrip includes single indication means for providing a visible indication similar only to the one the film cassette provides that the filmstrip inside the cassette housing is unexposed, to advise that the camera can be used only with a film cassette containing an unexposed filmstrip. Another type camera intended to be used with a film cassette containing an unexposed or partially exposed filmstrip includes respective indication means for providing visible indications similar to the ones the film cassette provides that the filmstrip inside the cassette housing is unexposed or is partially exposed, to advise that the camera can be used with a film cassette containing an unexposed or partially exposed filmstrip.

3 Claims, 2 Drawing Sheets

5,604,556

CAMERA WITH INDICATOR FOR PREVENTING LOAD OF EXPOSED FILM

FIELD OF THE INVENTION

The invention relates generally to the field of photography, and in particular to cameras with an indicator for preventing load of an exposed film.

BACKGROUND OF THE INVENTION

Commonly assigned prior art U.S. Pat. Nos. 5,305,042, issued Apr. 19, 1994, and U.S. Pat. No. 5,347,334, issued Sep. 13, 1994, each disclose a film cassette which is capable of being operated to thrust a filmstrip out of the cassette housing regardless of whether the filmstrip is fresh unexposed film, is partially exposed/unexposed film, or is fully exposed film. As a consequence, the film cassette is provided with film exposure-status indicating means which is adjustable for providing individual visible indications that the filmstrip inside the cassette housing is unexposed, is only partially exposed, or is fully exposed.

Commonly assigned prior art U.S. Pat. No. 4,965,600, issued Oct. 23, 1990, discloses a camera intended to be used with the film cassette when the filmstrip inside the cassette housing is unexposed or is partially exposed/unexposed. This is possible because the camera can operate the film cassette to return the filmstrip to the cassette housing when the filmstrip is only partly exposed and can operate the film cassette to thrust the filmstrip including the partially exposed film from the cassette housing to expose only the unexposed film. In this instance, the film cassette with the partially exposed film would be removed from the camera and not be put back into the camera until some later time. If the film cassette is operated to return the partially exposed film to the cassette housing, the camera changes the film exposure-status indicating means from a visible indication that the filmstrip inside the cassette housing is unexposed to a visible indication that the filmstrip is partially exposed. Conversely, when the filmstrip is fully exposed and returned to the cassette housing, the camera changes the film exposure-status indicating means from a visible indication that the filmstrip inside the cassette housing is unexposed or is partially exposed to a visible indication that the filmstrip is fully exposed.

Commonly assigned prior art U.S. Pat. No. 4,947,197, issued Aug. 7, 1990, discloses a camera intended to be used with the film cassette only when the filmstrip inside the cassette housing is unexposed. This is due to the inability of the camera to operate the film cassette to thrust the filmstrip including the partially exposed film from the cassette housing to expose only the unexposed film. In this instance, a film cassette with partially exposed film would not put back into the camera. Thus, the camera will only change the film exposure-status indicating means from a visible indication that the filmstrip inside the cassette housing is unexposed to a visible indication that the filmstrip is fully exposed.

SUMMARY OF THE INVENTION

A family of different type cameras intended for use with a film cassette which is capable of being operated to thrust a filmstrip out of the cassette housing, regardless of whether the filmstrip is unexposed or is partially exposed, and which has film exposure-status indicating means for providing visible indications that the filmstrip inside the cassette housing is unexposed or is partially exposed, comprising:

one type camera intended to be used only with a film cassette containing an unexposed filmstrip, including single indication means for providing a visible indication similar only to the one the film cassette provides that the filmstrip inside the cassette housing is unexposed, to advise that the camera can be used only with a film cassette containing an unexposed filmstrip; and another type camera intended to be used with a film cassette containing an unexposed or partially exposed filmstrip, including respective indication means for providing visible indications similar to the ones the film cassette provides that the filmstrip inside the cassette housing is unexposed or is partially exposed, to advise that the camera can be used with a film cassette containing an unexposed or partially exposed filmstrip.

DETAILED DESCRIPTION OF THE INVENTION

The invention is disclosed as being embodied preferably in cameras intended to be used with a film cassette disclosed in commonly assigned U.S. Pat. Nos. 5,305,042, issued Apr. 19, 1994, and U.S. Pat. No. 5,347,334, issued Sep. 13, 1994. Because features of the cameras are known as evidenced by commonly assigned U.S. Pat. No. 4,965,600, issued Oct. 23, 1990, and U.S. Pat. No. 4,947,197, issued Aug. 7, 1990, the description which follows is directed in particular only to those elements forming part of or cooperating directly with the disclosed embodiment. It is to be understood, however, that other elements may take various forms known to a person of ordinary skill in the art. For the sake of completeness, the four patents are incorporated in this application.

Figure 1:
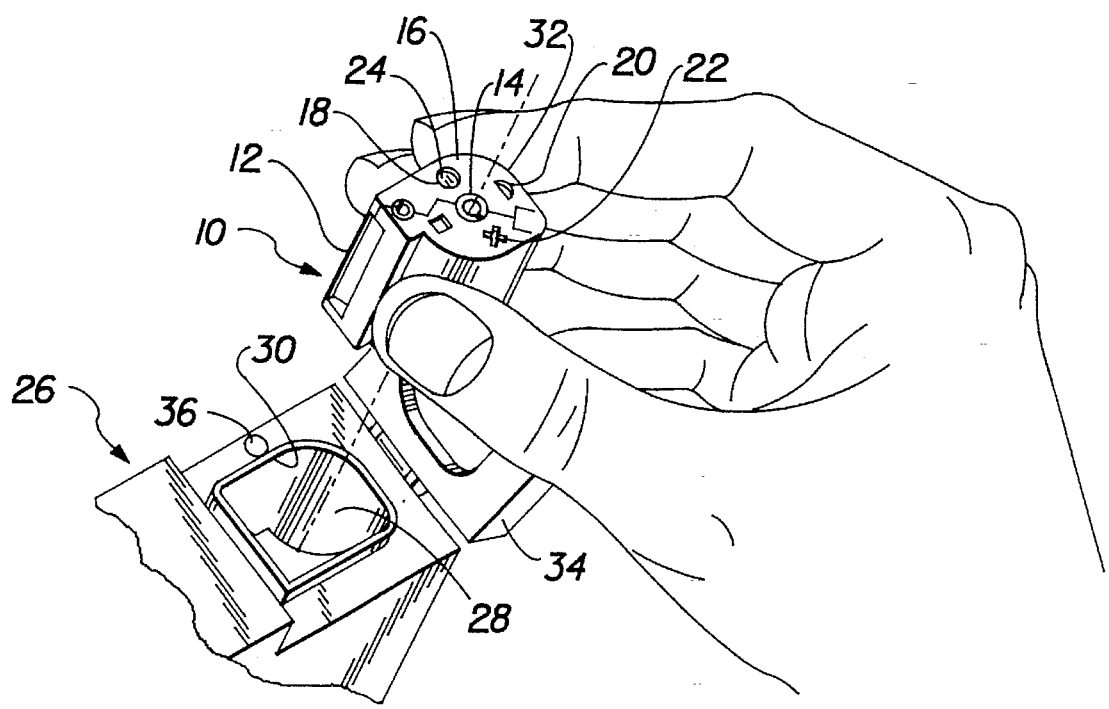
FIGS. 1 and 2 are perspective views of a type camera intended to be used only with a film cassette containing a fresh or unexposed filmstrip.
Figure 3:
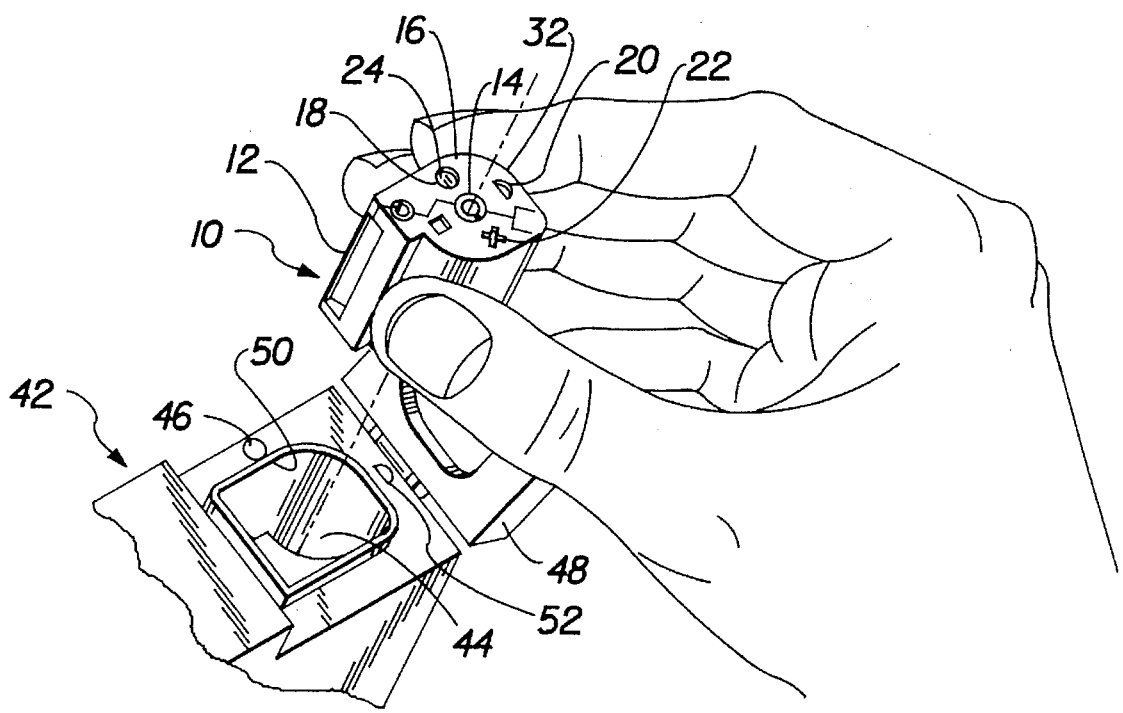
FIGS. 3 and 4 are perspective views of a type camera intended to be used with a film cassette containing an unexposed or partially exposed filmstrip.

Referring now to the drawings, FIGS. 1 and 3 show a film cassette 10 having a cassette housing 12 inside which a spool 14 is rotatably supported. A filmstrip (not shown) is stored in roll form on the spool 14. When the spool 14 is rotated in an unwinding direction, it operates to thrust the filmstrip out of the cassette housing 12 regardless of whether the filmstrip is fresh unexposed film, is partially exposed/unexposed film, or is fully exposed film. As a consequence, the film cassette 10 is provided with film exposure-status indicating means which is adjustable for providing individual visible indications that the filmstrip inside the cassette housing 12 is unexposed, is only partially exposed, or is fully exposed. Specifically, one end 16 of the cassette housing 12 has three icons shown as respective cut-outs 18, 20, and 22. The cut-out 18 is designed to effect an indication that the filmstrip inside the cassette housing 12 is unexposed. The cut-out 20 is designed to effect an indication that the filmstrip inside the cassette housing 12 is only partially exposed. The cut-out 22 is designed to effect an indication that the filmstrip inside the cassette housing 12 is fully exposed. An indicator flag 24 is coaxially fixed to the spool 14 to be rotated with the spool. The spool 14 is adapted to be rotationally arrested with the indicator flag 24 parked beneath whichever one of the cut-outs 18, 20, and 22 is indicative of the exposure status of the filmstrip inside the cassette housing 12. Thus, in FIGS. 1 and 3 the indicator flag 24 is shown beneath the cut-out 18 because the filmstrip inside the cassette housing 12 is unexposed.

Figure 2:
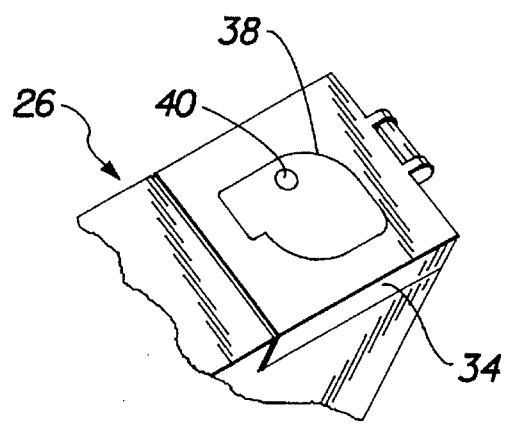

A camera 26 intended to be used with the film cassette 10 only when the filmstrip inside the cassette housing 12 is unexposed is shown in FIGS. 1 and 2. The camera 26 includes a cassette-receiving chamber 28 with a contour 30 similar to the contour 32 of the cassette housing 12, to facilitate insertion of the film cassette 10 end-first into the chamber as shown in FIG. 1. A pivotally supported door 34 is closed to cover the chamber 28. See FIG. 2.

A single indicator 36 placed inside the camera 26, adjacent the chamber 28, is identical to the cut-out 18 in order to advise that the camera can be used with the film cassette 10 only when the filmstrip inside the cassette housing 12 is unexposed. The indicator 36 is arranged in an orientation with respect to the contour 30 of the chamber 28 which is substantially similar to the orientation the cut-out 18 is arranged in with respect to the contour 32 of the cassette housing 12. See FIG. 1.

The door 34 has a an outline indicator 38 which matches the contour 32 of the cassette housing 12 and includes a single icon 40 which is identical to the cut-out 18. See FIG. 2.

Figure 4:
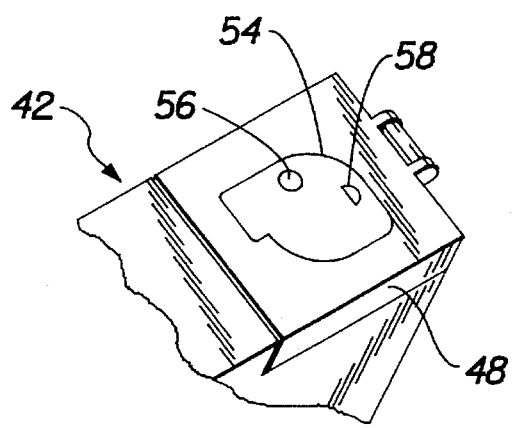

A camera 42 intended to be used with the film cassette 10 when the filmstrip inside the cassette housing 12 is unexposed or is partially exposed is shown in FIGS. 3 and 4. The camera 42 includes a cassette-receiving chamber 44 with a contour 46 similar to the contour 32 of the cassette housing 12, to facilitate insertion of the film cassette 10 end-first into the chamber as shown in FIG. 3. A pivotally supported door 48 is closed to cover the chamber 44. See FIG. 4.

Two different indicators 50 and 52 placed inside the camera 42, adjacent the chamber 44, are identical to the respective cut-outs 18 and 20 in order to advise that the camera can be used with the film cassette 10 when the filmstrip inside the cassette housing 12 is unexposed or is partially exposed. The indicators 50 and 52 are arranged in separate orientations with respect to the contour 46 of the chamber 44 which are substantially similar to the individual orientations the cut-outs 18 and 20 are arranged in with respect to the contour 32 of the cassette housing 12. See FIG. 3.

The door 48 has a an outline indicator 54 which matches the contour 32 of the cassette housing 12 and includes two different icons 56 and 58 which are identical to the respective cut-outs 18 and 20. See FIG. 4.

The invention has been described with reference to a preferred embodiment. However, it will be appreciated that variations and modifications can be effected by a person of ordinary skill in the art without departing from the scope of the invention.

PARTS LIST 10. film cassette
12. cassette housing
14. cassette spool
16. cassette end
18. cut-out
20. cut-out
22. cut-out
24. indicator flag
26. camera
28. cassette-receiving chamber
30. cassette-receiving chamber contour
32. cassette housing contour
34. door
36. indicator
38. indicator
40. icon
42. camera
44. cassette-receiving chamber
46. cassette-receiving chamber contour
48. door
50. indicator
52. indicator
54. indicator
56. icon
58. icon

We claim:

1. A family of different type cameras intended for use with a film cassette which is capable of being operated to thrust a filmstrip out of the cassette housing, regardless of whether the filmstrip is unexposed or is partially exposed, and which has respective film exposure-status indicating means for providing unexposed and partially exposed visible indications that the filmstrip inside the cassette housing is unexposed or is partially exposed, comprising:

one type camera intended to be used only with the film cassette when the film cassette contains an unexposed filmstrip and including (1) a cassette-receiving chamber with a contour substantially similar to a contour of the cassette housing and (2) only one indication means for providing an unexposed visible indication similar to the unexposed visible indication of the film cassette to advise that the one type camera can be used only with the film cassette when the film cassette contains an unexposed filmstrip, said one indication means being arranged in an orientation relative to the contour of said cassette-receiving chamber of the one type camera which is similar to the orientation the unexposed visible indication of the film cassette is arranged in relative to the contour of the cassette housing; and another type camera intended to be used with the film cassette when the film cassette contains an unexposed or partially exposed filmstrip and including (1) a cassette-receiving chamber with a contour substantially similar to a contour of the cassette housing and (2) respective indication means for providing unexposed and partially exposed visible indications similar to the unexposed and partially exposed visible indications of the film cassette to advise that the other type camera can be used with the film cassette when the film cassette contains an unexposed or partially exposed filmstrip, said respective indication means being arranged in orientations relative to the contour of said cassette-receiving chamber of the other type camera which are similar to the orientations the unexposed and partially exposed visible indications of the film cassette are arranged in relative to the cassette housing.

2. A camera intended for use with a film cassette which is capable of being operated to thrust a filmstrip out of the cassette housing, regardless of whether the filmstrip is unexposed or is partially exposed, and which has respective film exposure-status indicating means for providing unexposed and partially exposed visible indications that the filmstrip inside the cassette housing is unexposed or is partially exposed, comprising:

a cassette-receiving chamber with a contour substantially similar to a contour of the cassette housing; and only one indication means for providing an unexposed visible indication similar to the unexposed visible indication of the film cassette to advise that the camera can be used only with the film cassette when the film cassette contains an unexposed filmstrip, said one indication means being arranged in an orientation relative to the contour of said cassette-receiving chamber which is similar to the orientation the unexposed visible indication of the film cassette is arranged in relative to the contour of the cassette housing.

3. A camera intended for use with a film cassette which is capable of being operated to thrust a filmstrip out of the cassette housing, regardless of whether the filmstrip is unexposed or is partially exposed, and which has respective film exposure-status indicating means for providing unexposed and partially exposed visible indications that the filmstrip inside the cassette housing is unexposed or is partially exposed, comprising:

a cassette-receiving chamber with a contour substantially similar to a contour of the cassette housing; and respective indication means for providing unexposed and partially exposed visible indications similar to the unexposed and partially exposed visible indications of the film cassette to advise that the camera can be used with the film cassette when the film cassette contains an unexposed or partially exposed filmstrip, said respective indication means being arranged in orientations relative to the contour of said cassette-receiving chamber camera which are similar to the orientations the unexposed and partially exposed visible indications of the film cassette are arranged in relative to the cassette housing.

* * * * *